No. 800,005. PATENTED SEPT. 19, 1905.
T. McEWING.
BLOCKING AND CULTIVATING MACHINE.
APPLICATION FILED SEPT. 12, 1904.

Witnesses
Georgiana Chace
Edward R. Monroe

Inventor
Thomas McEwing
By Luther V. Moulton
Attorney

UNITED STATES PATENT OFFICE.

THOMAS McEWING, OF LANSING, MICHIGAN.

BLOCKING AND CULTIVATING MACHINE.

No. 800,005.        Specification of Letters Patent.        Patented Sept. 19, 1905.

Application filed September 12, 1904. Serial No. 224,146.

*To all whom it may concern:*

Be it known that I, THOMAS McEWING, a citizen of the United States, residing at Lansing, in the county of Ingham and State of Michigan, have invented certain new and useful Improvements in Blocking and Cultivating Machines; and I do hereby declare the following to be a full, clear, and exact description of the invention, such as will enable others skilled in the art to which it appertains to make and use the same.

My invention relates to improvements in blocking and cultivating machines, and more particularly to such machines as shown and described in patent to me numbered 765,900 and dated July 26, 1904; and its object is to provide a device less likely to clog with weeds or grass, to provide the same with cultivators vertically movable independent of the blocking-shoes, to provide a simple and durable structure, and to provide the device with various new and useful features hereinafter more fully described, and particularly pointed out in the claims, reference being had to the accompanying drawings, in which—

Figure 1:
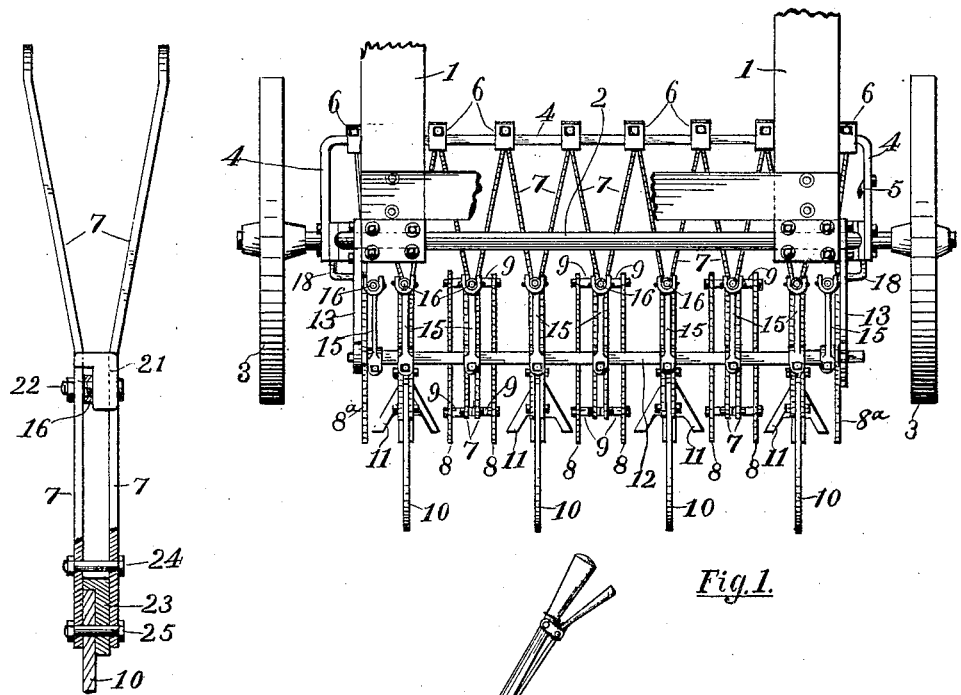
Figure 3:
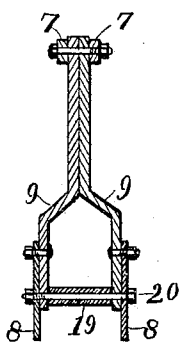
Figures 2, 4:
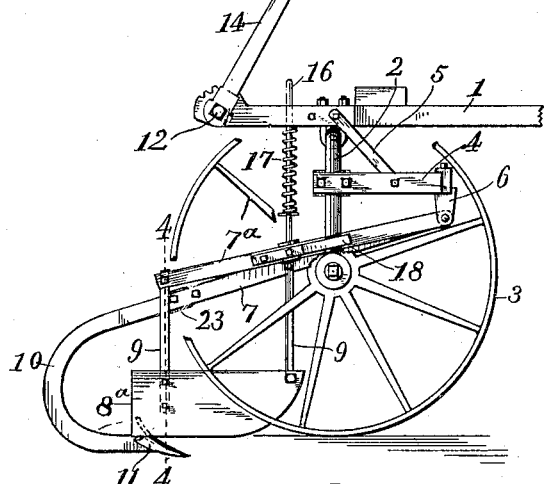
Figure 5:
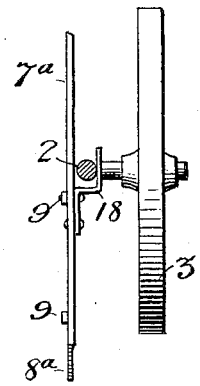

Figure 1 is a plan view of a device embodying my invention; Fig. 2, a side elevation of the same with parts removed; Fig. 3, an enlarged detail in plan view of the cultivator draw-bars; Fig. 4, the same in vertical section of the blocking-shoes and means for connecting them to their draw-bars and taken on the line 4 4 of Fig. 2; and Fig. 5 is a detail of the guiding means for the outer draw-bars.

Like numerals refer to like parts in all of the figures.

1 represents any frame to which the animals to draw the device are attached and on which a seat for the operator is mounted. An axle-bar 2 extends across the frame and is secured thereto. This bar is bent downward at each side of the frame and thence outward at the ends, on which ends are journaled supporting-wheels 3.

4 is a transverse beam located beneath the frame and having its respective ends extended rearward at right angles and attached to the downwardly-extended parts of the bar 2. From this beam to the frame 1 extend braces 5, whereby the parts are rigidly held in proper position. At intervals on the beam 4 are downwardly-projecting brackets 6, which are adjustable longitudinally of the beam to vary the spacing apart of the blocking-shoes 8 and cultivators 11. To these brackets are pivoted the forward ends of the draw-bars 7, two to each bracket. These draw-bars are flexible in a horizontal direction and are coupled in pairs, the bars attached to each bracket diverging and coupled to the adjacent bars of the adjacent brackets. To each pair of bars thus coupled is attached the respective pairs of blocking-shoes 8 and the cultivators 11, arranged in alternate series. The blocking-shoes 8 are arranged in pairs (except those at the ends) and in parallel planes and spaced apart by tubes 19 and held together by bolts 20. Each pair of shoes 8 are attached to a corresponding pair of draw-bars at front and rear by diverging bars 9 9, secured at their respective ends to the draw-bars and shoes.

Each cultivator 11 is attached to a pair of draw-bars by a shank 10, consisting of a bar inserted at its upper end in a recess in a block 23, pivoted on a bolt 25, extending through said block and the draw-bars. This shank is extended from the block rearward, downward, and then forward in a curve and has the cultivator-blade 11 attached at its lower and forwardly-projecting end. To further clamp the block between the draw-bars and frictionally hold the same from turning, in addition to the pivot-bolt 25 a second bolt 24 extends through the draw-bars close in front of the block 23. The block is thus held from turning under all ordinary strains; but in the event that the cultivator engages an obstruction that will not yield the block 23 will turn between the draw-bars, and thus permit the cultivator to move backward and upward and thus become detached from the obstruction without breaking the machine.

Extending rearward from the frame 1 are hangers 13, in which is journaled a rock-shaft 12, adjustable about its axis by a lever 14, attached thereto and held by the usual latch and notched sector. On this rock-shaft is mounted a series of arms 15, one over each pair of draw-bars and adjustable on the rock-shaft. Extending downward from each arm and attached to each pair of draw-bars is a rod 16, inserted in a recess in a spacing-block 21 between the draw-bars and pivoted on a bolt 22, extending through the block and draw-bars. The upper end of each rod 16 is slidably connected to the arm 15 in the usual way and provided with the usual depressing-spring 17 to act on the draw-bars. The shoes 8 and cultivators 11 are thus independently operated and will therefore conform closely to the contour of the surface operated upon and also freely discharge any grass or weeds between the shoes and cultivators. A single shoe 8ª is attached to a single outer draw-bar 7ª, and to this draw-bar is attached a clip 18, adapted to slide on the downwardly-extended portion of the axle-bar 2, and thus prevent lateral motion of the draw-bar and shoe.

In operation each pair of shoes severs the soil at each side of the block of the row that is to be left and also protects the same from any soil thrown outward by the cultivators, and the cultivators remove the row between the blocks. Each cultivator, and each pair of shoes being independently movable about the pivots of the draw-bars, will conform to any inequality of the surface of the soil more nearly than when the cultivators and blocking-shoes are attached as heretofore, and any grass or weeds will escape between the cultivators and shoes and will not clog the device.

In the event that the spaces between the blocks are to be changed the same can be done by taking out or adding blocking-shoes and cultivators, together with their draw-bars, and adjusting the brackets 6 on the beam 4 to conform thereto.

Having thus fully described my invention, what I claim, and desire to secure by Letters Patent, is—

1. In a blocker and cultivator, a series of pairs of blocking-shoes and cultivators arranged alternately, and separate draw-bars for each pair of shoes and each cultivator.

2. In a blocker and cultivator, a series of pairs of blocking-shoes, a series of cultivators arranged alternately with the pairs of blocking-shoes, separate and independently-movable draw-bars for the several pairs of shoes and the several cultivators, separate depressing-springs and lifting-rods for the same, and means for simultaneously adjusting the springs and rods.

3. In a blocker and cultivator, a frame, an axle-bar secured to the frame and extended downward and outward at each side thereof, supporting-wheels on the ends of said bar, a transverse beam bent rearward at its ends and attached to the downwardly-extended parts of the axle-bar, braces extending from the frame to the beam, draw-bars pivotally connected to the beam, and blocking-shoes and cultivators attached to the draw-bars.

4. In a blocker and cultivator, a frame, an axle-bar attached to the frame and extending downward and outward at each side thereof, supporting-wheels journaled on the ends of said bar, a transverse beam extended rearward at each end and attached to the downwardly-extended portions of the axle-bar, braces connecting the beam and frame, a series of draw-bars pivotally connected to the beam, shoes and cultivators attached to the draw-bars, and clips attached to the outer draw-bars, and adapted to slidably engage the downwardly-extended portions of the axle-bar.

5. In a blocker and cultivator, a frame, an axle-bar secured to the frame and extended downward and outward at each side of the same, wheels journaled on the ends of said bar, a transverse beam extended rearward at each end and attached to the vertical parts of the axle-bar, a series of adjustable brackets on the beam, flexible draw-bars pivoted to the brackets, a series of pairs of blocking-shoes and cultivators attached to the draw-bars, a rock-shaft, means for adjusting the rock-shaft about its axis, arms adjustable on the rock-shaft, lifting-rods connecting the arms and draw-bars, and springs on the rods to depress the draw-bars.

6. In a blocker and cultivator, draw-bars arranged in pairs, recessed blocks between the draw-bars, cultivator-shanks inserted in the blocks, pivot-bolts extending through the draw-bars blocks and shanks, and clamping-bolts extending through the draw-bars close to the spacing-blocks.

7. In a blocker and cultivator, two draw-bars arranged parallel and spaced apart, two recessed spacing-blocks between the bars, a lifting-rod inserted in the recess of one block, a cultivator-shank inserted in the recess of the other block, and pivot-bolts extending through the draw-bars, blocks, rod and shank.

8. The combination of a series of shoes and cultivators arranged alternately, separate draw-bars for the shoes and separate draw-bars for the cultivators, whereby the same are independently movable, means for simultaneously lifting all of the draw-bars cultivators and shoes, and springs to separately depress the cultivators and shoes.

9. In a blocker and cultivator, draw-bars pivoted at their forward end, a pivoted and recessed spacing-block between the rear ends of the draw-bars, a bolt extending through the draw-bars and frictionally holding the spacing-block from turning, a cultivator-shank inserted in the spacing-block and thence extended rearward, downward and forward in a curve, a cultivator attached to the lower end of the shank, and means for raising and lowering the draw-bars, shank and cultivator.

10. In a blocker and cultivator, a frame, an axle extending across the frame and thence vertically downward, and thence outward at each end, a draw-bar pivoted at the front end and extending adjacent to the vertical part of the axle, a clip attached to the draw-bar and slidably engaging the axle opposite the draw-bar, and a shoe attached to the draw-bar.

In testimony whereof I affix my signature in presence of two witnesses.

THOMAS McEWING.

Witnesses:
NELLE M. HOLDEN,
DANIEL J. MAHONEY.